United States Patent [19]

Baatrup et al.

[11] 4,159,723

[45] Jul. 3, 1979

[54] CONTROL DEVICE FOR STEERING APPARATUS OR THE LIKE

[75] Inventors: Johannes V. Baatrup; Ivar Rasmussen, both of Sonderborg, Denmark

[73] Assignee: Danfoss A/S, Nordborg, Denmark

[21] Appl. No.: 874,886

[22] Filed: Feb. 3, 1978

[51] Int. Cl.² ............................................. F15B 13/04
[52] U.S. Cl. ................................. 137/596.13; 60/384; 137/625.24; 180/132; 418/61 B
[58] Field of Search ............. 60/384; 137/596, 596.13, 137/625.24; 180/132; 418/61 B

[56] References Cited
U.S. PATENT DOCUMENTS

| | | | |
|---|---|---|---|
| 3,385,057 | 5/1968 | Pruvot et al. | 418/61 B X |
| 3,584,985 | 6/1971 | Baatrup | 418/61 B |

*Primary Examiner*—Gerald A. Michalsky
*Attorney, Agent, or Firm*—Wayne B. Easton

[57] ABSTRACT

The invention relates to a vehicle steering control device of the type having a housing, inner and outer rotary slide members disposed in a bore of the housing and forming a reversing switch. The housing has inlet and outlet ports and two motor ports. Four axially adjacent spaced grooves being in the interface between the bore of the housing and the outer rotary slide member with the first and fourth grooves being connected to the inlet and outlet ports and second and third grooves being connected to the two motor ports. A steering shaft is connectable to the inner rotary slide member and a measuring motor which, on actuation of the control device, is connected to the inlet port to cause the outer rotary slide member to follow the inner rotary slide member. The leakage of pressurized fluid from one annular groove to another can cause erratic operation because the fluid in the motor passages linked by the second or third grooves is a definite, precise metered quantity because it is supplied by the metering motor. To impede the short circuiting of pressurized fluid from one annular groove to another, auxiliary annular grooves containing unmetered pressurized fluid are provided adjacent to the second and third grooves to impede the flow of pressurized fluid into or out of these grooves.

2 Claims, 1 Drawing Figure

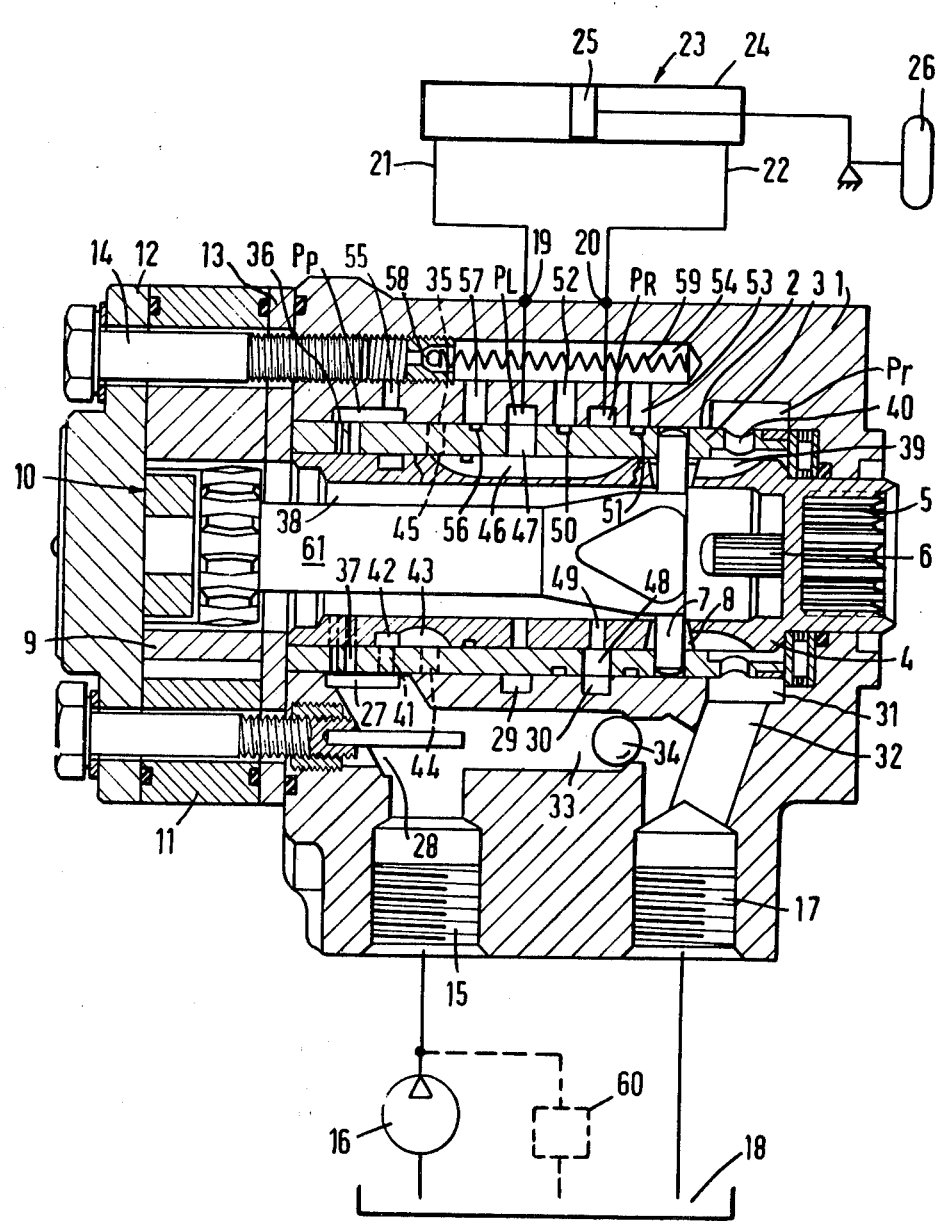

CONTROL DEVICE FOR STEERING APPARATUS OR THE LIKE

The invention relates to a control device for steering apparatus or the like comprising a housing, an outer and an inner rotary slide disposed in a bore of the housing and forming a reversing switch, four axially adjacent annular grooves being provided at the sliding face between the bore of the housing and the rotary slides, preferably in the bore of the housing, the first groove being connected to a pump connection, the second and third to a respective connection to an operating conduit leading to an operating motor and the fourth to a tank connection, a steering shaft connected to the inner rotary slide, and a measuring motor which, on actuation of the control device, is connected between the pump connection and the upstream side of the operating conduit connection and causes the outer rotary slide to follow the inner rotary slide.

A control device of this kind is known, in which an outer and an inner rotary slide are disposed in the bore of the housing. The inner rotary slide is connected to a steering shaft and, together with the outer rotary slide, forms a reversing valve which determines the direction of movement of the operating motor. The measuring motor possesses a rotating and gyrating piston connected to the outer rotary slide by an articulated shaft and a transverse pin. Together with the bore, the outer rotary slide forms a distributing valve for the measuring motor. The inner rotary slide is adjustable relatively to the outer rotary slide against the force of a return spring through an angle limited by abutments. The interior of the inner rotary slide communicates with the fourth annular groove by way of apertures in both rotary slides. In the neutral position, the first annular groove is connected to the said interior by way of neutral position orifices in both rotary slides.

If in such a control device the steering shaft and thus the inner rotary slide are turned, the reversing valve opens and pressure fluid will flow to the operating motor until the outer rotary slide has been brought up with the aid of the measuring motor and the reversing valve closes again. In this way the rotary motion of the steering shaft is accurately transmitted to the adjusting motion of the operating motor. However, this often results in a slip which affects the accuracy of steering and is also unequal for left-hand and right-hand rotation.

The invention is based on the problem of providing a control device of the aforementioned kind in which there is a greater degree of coincidence between the steering shaft adjustment and adjustment of the operating motor.

This problem is solved according to the invention in that a first auxiliary annular groove is disposed between the second and third annular groove and a second auxiliary annular groove between the third and fourth annular groove, and that both auxiliary annular grooves are connected to the pump connection.

Upon actuating the control device, in the one direction of adjustment the second annular groove has a higher pressure (which is somewhat lower than the pump pressure and, when the operating motor has reached its end position, reaches the pump pressure) and the third annular groove is at the tank pressure. In the other direction of adjustment, the conditions are the reverse. Accordingly, it was hitherto possible for oil to leak out of the second annular groove into the third annular groove in the one direction of adjustment and out of the third annular groove into the second annular groove and the fourth annular groove in the other direction of adjustment. The quantity of this last-mentioned leakage oil was greater than the amount of the first-mentioned leakage oil because it flowed off into annular grooves. Since this leakage oil had already been measured by the measuring motor, a particular adjustment of the operating motor gave rise to a greater amount of rotation of the steering shaft. In the end position of the operating motor, it was even possible slowly to turn the steering shaft further. These conditions were different for right-hand and left-hand rotation because of the different amounts of leakage oil. By reason of the fact that the auxiliary annular grooves are provided, which are also at pump pressure, the path for leakage liquid is eliminated. Although leakage liquid now penetrates from the auxiliary annular grooves to the adjacent annular grooves at tank pressure, this is harmless because this leakage liquid was not measured by the measuring motor. It is therefore possible almost completely to prevent undesirable leakage at this position. In so far as leakage may arise at other positions, the same conditions will apply to both steering devices. Accordingly, when turning left, the driver of a vehicle does not have to steer differently from when he turns right.

Another advantage is that the control device can have a short axial length. This is because the axial spacing between the individual annular grooves can be shorter since disruptive leakage flow is prevented by the auxiliary annular grooves.

If control orifices are provided between the first and second annular groove and are connected to the downstream side and possibly also to the upstream side of the measuring motor, it is favourable that a third auxiliary annular groove connected to the pump connection is provided between the control orifices and the second annular groove. The third auxiliary annular groove prevents passage of the pressure fluid that has already been measured from the downstream control orifices to the second annular groove if the latter is at tank pressure. This supresses a further leakage path that could lead to different conditions for right-hand and left-hand motion. Since the pressure of the downstream control orifices is only slightly less than pump pressure, there is no danger of the conditions being affected by pressure fluid passing from the third auxiliary annular groove to the said control orifices.

If the measuring motor comprises a rotating and gyrating piston connected to the outer rotary slide by an articulated shaft and a transverse pin, the articulated shaft being disposed in a space communicating with the tank connection, it is advisable for the transverse pin to be disposed on that side of the second auxiliary annular groove which is remote from the third annular groove. The bore receiving the transverse pin in the outer rotary slide establishes communication to a space at tank pressure. However, this is harmless because a pressurised auxiliary annular groove is interposed between this bore and the third annular groove.

From a constructional point of view it is favourable if a longitudinal bore in the housing is connected by a respective radial bore to the first annular groove and to the auxiliary annular grooves. This leads to a space-saving arrangement of the passages.

Further, the auxiliary annular grooves may be formed in the outer rotary slide.

There are numerous control devices in which the pressure at the pump connection can be lowered in the neutral position. This is, for example, the case if the rotary slides are provided with neutral position orifices which, in the neutral position, connect the first annular groove that is connected to the pump connection to the interior of the inner rotary slide that is at tank pressure. There are also arrangements in which the pump pressure is lowered on a drop in demand, for example by means provided at the pump or by a shunt valve. In these cases the auxiliary annular grooves are at this lower pressure. If, now, the operating motor is loaded by external forces, leakage liquid can pass from the second or third annular groove into the auxiliary annular grooves, thereby resulting in undesirable take-off. This is avoided if the two auxiliary annular grooves are preceded by a spring-loaded check valve. Consequently no leakage liquid can flow off through these auxiliary annular grooves.

The check valve can for example be provided in the longitudinal bore between the first annular groove and the auxiliary annular grooves so that practically no additional space is required.

BRIEF DESCRIPTION OF THE DRAWING

The drawing shows a longitudinal section of an embodiment of the invention.

An example of a control device will now be described in more detail with reference to the longitudinal section in the drawing.

The illustrated control device comprises a housing 1 with a bore 2 in which there is disposed an outer rotary slide 3 and in this an inner rotary slide 4. The inner rotary slide 4 is provided with a coupling 5 for a steering shaft. It can be turned through a limited angle towards the outer rotary slide 3 against the force of leaf springs 6. This angle is predetermined by a trnasverse pin 7 against which abutments provided in the peripheral direction come to lie in an aperture 8. The outer rotary slide 3 is connected by the transverse pin 7 to an articulated shaft 61 which produces a connection against rotation to the rotary piston 9 of a measuringmotor 10 that is in the form of a gear. The measuring motor also comprises a stationary internally-serrated gear ring 11 which, together with an end plate 12 and an intermediate plate 13, is secured to the housing 1 with the aid of screws 14.

The housing comprises a connection 15 which can be connected to a pump 16, as well as a connection 17 which can be connected to a tank 18. In addition, two connections 19 and 20 are indicated (disposed in a sectional plane that is not visible) which can be connected to two operating conduits 21 and 22 leading to an operating motor 23 which in this case consists of a cylinder 24 and piston 25 and serves to provide steering adjustment for a wheel 26. At the sliding face between the bore 2 and the outer rotary slide 3, namely in the surface of the bore, four annular grooves are provided next to each other displaced axially. A first annular groove 27 is connected by a passage 28 to the pump connection 15. A second annular groove 29 is connected to the operating conduit connection 19 and a third annular groove 30 to the operating conduit connection 20. A fourth annular groove 31 is connected by a conduit 32 to the tank connection 17. Between the two conduits 28 and 32 there is a connecting passage 33 with a check valve 34 which opens when there is a higher pressure at the tank connection 17 than at the pump connection 15. Further, leading from the bore there are control orifices 35 which extend to a compression chamber between the teeth of the measuring motor 10 and act alternately as upstream and downstream control orifices.

The outer rotary slide 3 as well as the inner rotary slide 4 have neutral position orifices 36 and 37, respectively, which are in registry in the neutral position and connect the first annular groove 27 to the interior 38 of the second rotary slide 4. This interior communicates with the annular groove 31 at tank pressure by way of the apertures 8, longitudinal grooves 39 in the inner rotary slide 4 and radial holes 40 in the outer rotary slide 3. In the neutral position, therefore, the pump connection 15 is connected to the tank connection 17. The pressure at the pump connection 15 drops correspondingly.

In the drawing, the position of the rotary slides is shown at which the operating motor 23 moves its piston 25 to the right. For this reason the neutral position orifices 36 and 37 are displaced with respect to one another, i.e. they are closed. Pressure fluid then penetrates through radial holes 41 from the first annular groove 27 to an annular groove 42 in the inner rotary slide 3 and then through axial passages 43 to radial holes 44 which communicate with the control orifices 35. The pressure fluid is then led through the measuring motor 10. From other control orifices, the outflowing pressure fluid reaches axial passages 46 by way of radial holes 45. From here, it reaches the second annular groove 29 through radial holes 47 and then arrives at the operating motor 23. The returning fluid arrives in the third annular groove 30 and, through radial holes 48 and 49, in the interior 38 at tank pressure. On rotation of the steering shaft in the opposite direction, pressure fluid is fed from the measuring motor 10 first into the third annular groove 30 and then back to the tank through the measuring motor 23 and the second annular groove 29.

In the illustrated position, therefore, the first annular groove 27 is at pump pressure $P_P$, the second annular groove 29 is at operating pressure $P_L$ which corresponds to the pump pressure up to the pressure drop in the measuring motor 10, whilst there is tank pressure $P_T$ in the fourth annular groove 31 and a pressure $P_R$ equal to the tank pressure $P_T$ in the third annular groove 30. Consequently a certain amount of pressure fluid could flow out of the second annular groove 29 along the sliding face between the outer rotary slide 3 and the bore 2 of the housing to the third annular groove 30. Since this is pressure fluid that has already been measured, there would be a greater amount of adjustment at the measuring motor 10 than that corresponding to the operating motor 23. Similarly, in the opposite direction of adjustment, a greater amount of pressure fluid could flow out of the third annular groove 30 to the second annular groove 29 and the fourth annular groove 31. These conditions are particularly marked when the operating motor 23 has reached an end position because the measuring motor will then move further to the extent of the leakage flow. They lead to undesirable slip which is different for both directions of steering.

This disadvantage is avoided in that two auxiliary annular grooves 50 and 51 are provided between the second annular groove 29 and the third annular groove 30 as well as between the third annular groove 30 and the fourth annular groove 31 or the transverse pin 7. Both auxiliary grooves are connected by radial holes 52 and 53 to an axial hole 54 which, in turn, communicates with the first annular groove 27 by way of a radial hole 55. Consequently there is pump pressure in the auxiliary annular groove 50 and 51. This prevents leakage flow of pressure fluid that has already been measured. The fact that pressure fluid passes from the auxiliary annular grooves into the annular grooves at tank pressure is insignificant to the accuracy of operation.

Further, a third auxiliary annular groove 56 is also provided between the control orifices 35 and the second annular groove 29, this groove 56 being connected by a radial hole 57 to a longitudinal hole 54 and therefore being at pump pressure. It prevents the passage of measured pressure fluid from the downstream (and of course also the upstream) control orifices into the second annular groove 29 when this is at tank pressure $P_T$, which improves the steering accuracy and symmetry during steering.

A check valve 58 influenced by a spring 59 is inserted in the longitudinal hole 54. This check valve closes when the pressure in the auxiliary annular grooves 50, 51 or 56 becomes larger than the pressure at the pump connection 15. This can occur in the neutral position when the pressure at the pump connection 15 is only somewhat higher than the pressure at the tank connection 17 but an external force is exerted on the operating motor 23 to give rise to a higher pressure in the annular groove 29 or 30 than the pressure at the pump connection 15. Although this pressure could result in the passage of pressure fluid into the auxiliary annular grooves 50, 51 or 56, no fluid can be out of same because of the check valve 58 and thus there is no adjustment of the operating motor.

The drawing shows in broken lines that the pump 16 is provided with a regulator 60, in this case a shunt valve, so that the pump pressure can be brought to the desired conditions. In this manner of regulation the pressure at the pump inlet 15 can also become smaller than the pressure in the annular grooves 29 or 30 if an external force occurs at the operating motor.

We claim:

1. A control device for steering apparatus or the like comprising a housing having (1) a longitudinally extending bore (2) inlet and outlet ports and (3) two motor ports, outer and inner rotary slide members disposed in said bore and having supply, exhaust and switching passages interconnecting said ports, switching means wherein said slide members are in axially fixed relation relative to each but have limited rotary movement relative to each other to cause switching of said passages for alternately and selectively connecting said inlet port to either one of said motor ports and said outlet port to the other one of said motor ports, two axially spaced annular grooves being formed in the interface between said bore and said outer rotary slide member being respectively connected to said motor ports, said inner slide member having a steering shaft connection, a measuring motor connected to said inner slide member having the input side thereof connected to said inlet port and the output side thereof selectably connectable to either of said motor ports, three axially spaced auxiliary annular grooves formed in the interface between said housing bore and said outer rotary slide member in straddling relation to said two motor port annular grooves to impede the shortcircuiting flow of pressure fluid between said motor ports and from one of said motor ports to said outlet port, means for pressurizing all of said auxiliary annular grooves for all rotary positions of said inner slide member including the neutral position thereof.

2. A control device according to claim 1 wherein said means for pressurizing said auxiliary annular grooves includes bore means in said housing with check valve means therein on the upstream side of said auxiliary annular grooves.

* * * * *